United States Patent [19]

Lenahan et al.

[11] Patent Number: 4,482,963
[45] Date of Patent: Nov. 13, 1984

[54] CLOSED LOOP BALANCING

[75] Inventors: James B. Lenahan, Pittsfield, N.H.; Arnold A. Baier, Wilmington, N.C.

[73] Assignee: General Electric Company, Cincinnati, Ohio

[21] Appl. No.: 363,704

[22] Filed: Mar. 30, 1982

[51] Int. Cl.³ .............................................. G05F 15/20
[52] U.S. Cl. .................................. 364/463; 364/508; 364/571
[58] Field of Search ............... 364/496, 505, 506, 508, 364/550, 571, 463; 73/459, 460, 462, 464, 465, 476, 472, 458, 468

[56] References Cited

U.S. PATENT DOCUMENTS

| | | |
|---|---|---|
| 2,779,217 | 1/1957 | Stovall, Jr. et al. |
| 2,810,307 | 10/1957 | Hack |
| 2,816,463 | 12/1957 | Budington et al. |
| 3,159,059 | 12/1964 | Fibikar et al. |
| 3,232,118 | 2/1966 | Hack |
| 3,272,975 | 9/1966 | Csech ........................... 73/462 |
| 4,015,480 | 4/1977 | Giers ............................. 73/462 |
| 4,028,524 | 6/1977 | Moll et al. |

OTHER PUBLICATIONS

"The Gimmecked Arbor" Schenk Trebel Corp., 11/30/81.

Primary Examiner—James D. Thomas
Assistant Examiner—Dale M. Shaw
Attorney, Agent, or Firm—Donald W. Walk; Gregory A. Welte; Derek P. Lawrence

[57] ABSTRACT

A balancing method is provided for dynamically balancing parts intended for use in rotating machines. The method is most advantageous when used on parts that are originally cut on a numerically controlled cutting machine or are easily defined by a part cutting program. The method begins with rotating the part and producing electrical error signals proportional to the part's imbalance. The error signals are used to determine in digital format an amount and location of material that must be removed from the part to render it rotationally balanced. The part cutting program is then appropriately modified so that if the part is remachined, the necessary material will automatically be removed. The part is then properly positioned in a numerically controlled cutter, remachined using the modified part cutting program, and the necessary material is automatically removed.

1 Claim, 11 Drawing Figures

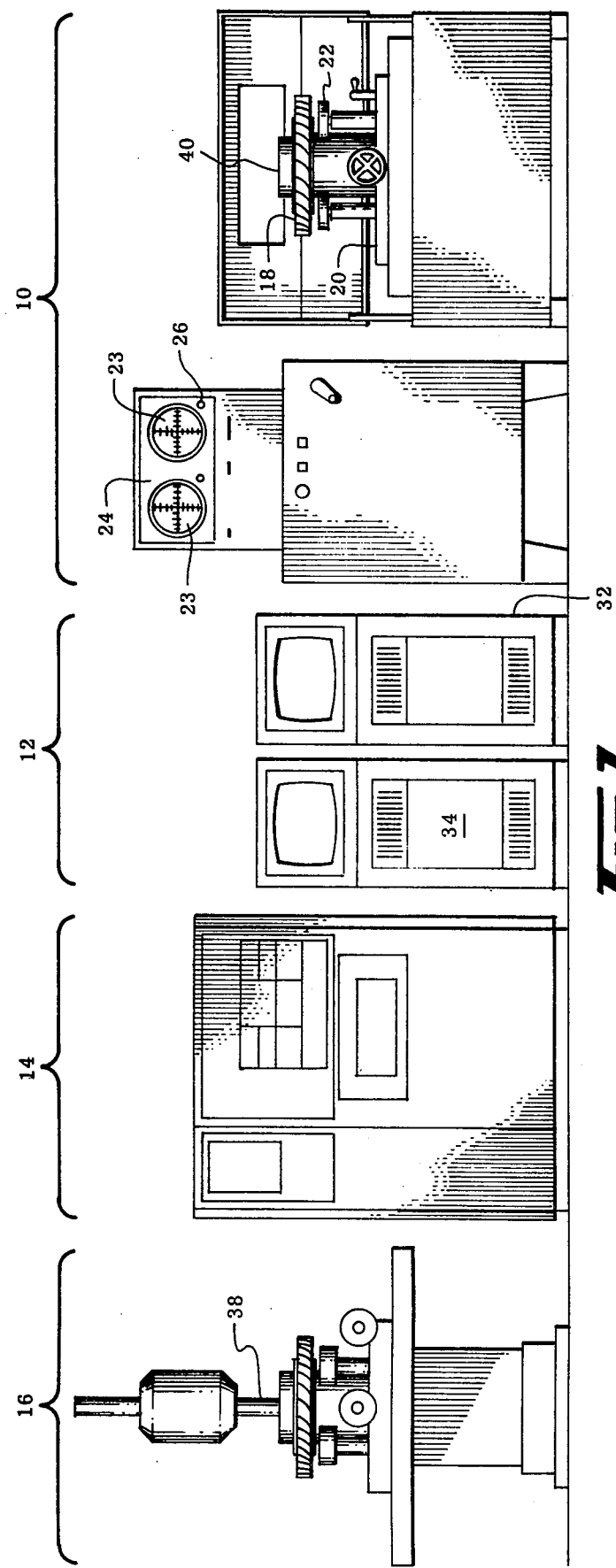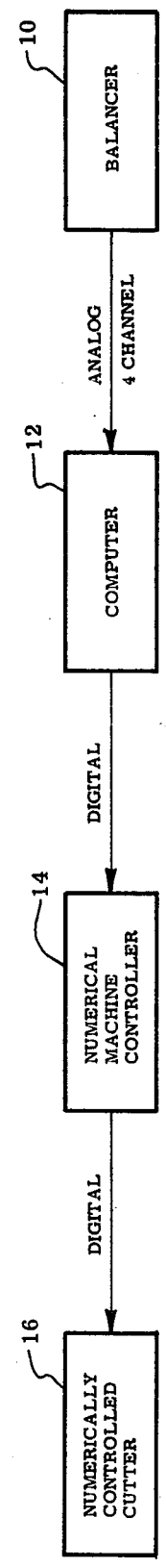

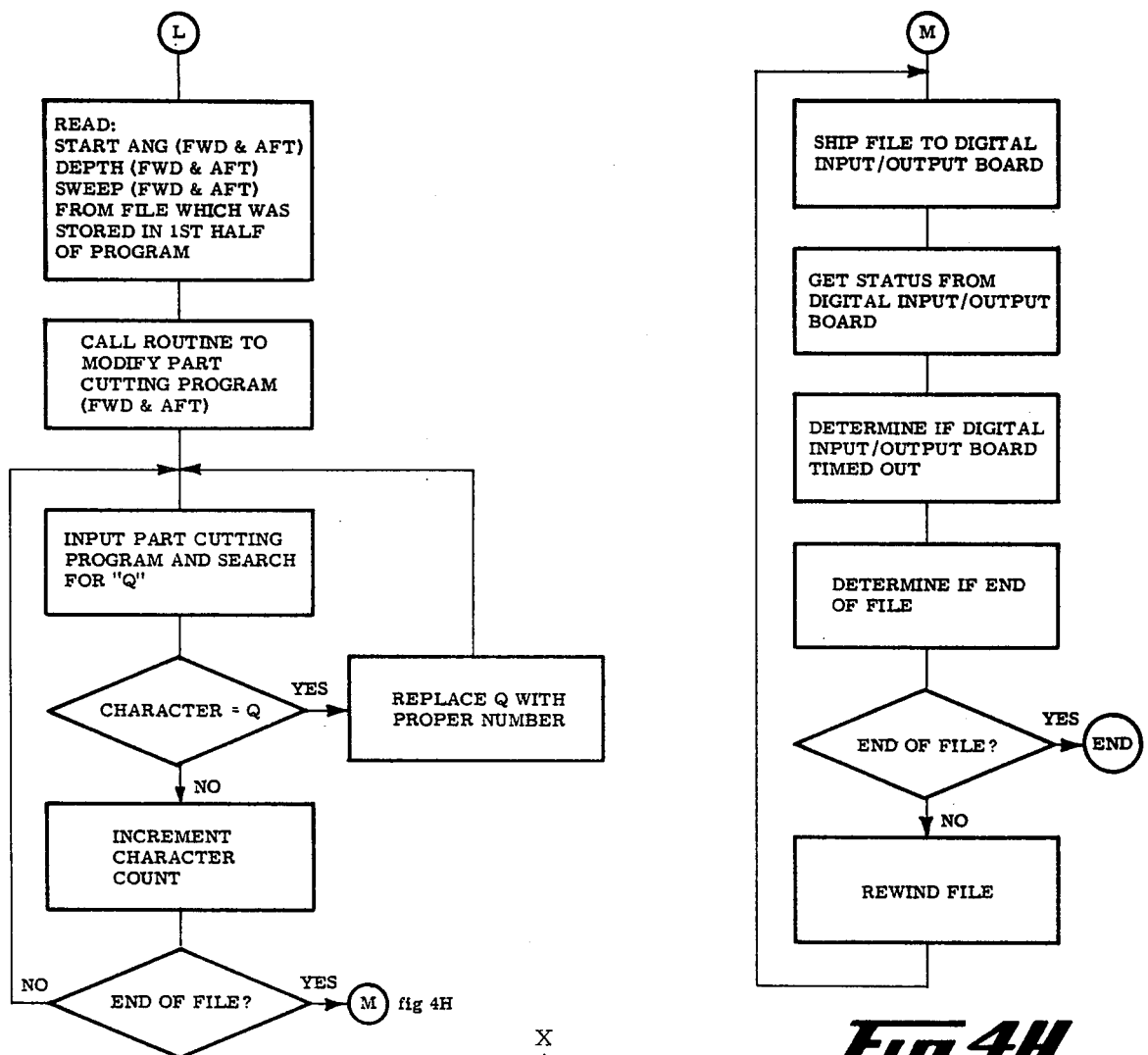
Fig 4G
Fig 4H
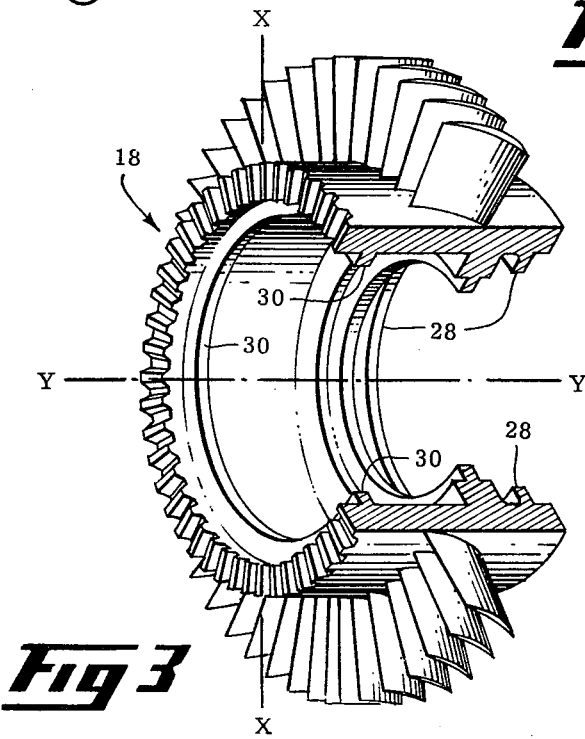
Fig 3

CLOSED LOOP BALANCING

BACKGROUND OF THE INVENTION

1. Field of the Invention

The subject invention relates to automatic balancing systems and more particularly to balancing systems that incorporate a cutting machine to remove material from a subject part to render the part rotationally balanced.

2. Summary of the Prior Art

A wide variety of systems have been developed to satisfy a broad-based need for balancing parts used in rotating machines.

One of these systems for balancing parts has been a combination of an electric analog balancer with a skilled operator who manually calculates a part's imbalance using polar graph paper. After calculating the error, the approximate amount of material to be removed was obtained from a chart of previously calculated material removal values. This system of operator calculation involves vector analysis on vector graph paper which inherently requires a certain degree of operator sophistication. The part would then be placed on a manually operated cutting machine, and the necessary part material would be removed to bring the part into a balanced condition for use in a rotating environment.

This manual system has several drawbacks. The use of polar graph paper is generally inaccurate because it requires user interpolation, and the variation in thickness of a pencil lead alone can cause significant errors. The use of charts that cannot realistically list all possible values also necessitates user interpolation. Also, the manual operation of cutting the part is time consuming, and when errors are made, an almost finished part can become useless.

A variety of other balancing systems that achieve varying degrees of automation have been developed. One of the more intriguing systems is disclosed in U.S. Pat. No. 4,028,524. This disclosed system uses a laser beam to accomplish the necessary removal on a trial and error basis. This system has one drawback in that lasers, at least to date, can only be used to remove small amounts of part material and lasers require a clear path of firing.

Many other balancing systems are disclosed by the prior art. These have certain advantages and disadvantages, but none are particularly suited for automatically calculating a correct amount and location of material to be removed and then removing that material with a common cutting machine.

SUMMARY OF THE INVENTION

It is, therefore, an object of the present invention to provide a method for measuring imbalance of a part intended for use in a rotating environment, automatically calculating the amount and location of material removal necessary to balance the part and then actually removing the necessary material.

It is another object of the present invention to provide a method of balancing a part wherein the design of the part is inherently accounted for in the steps of determining an amount and location of material removal necessary to render the part balanced and wherein a cutting machine can be automatically controlled to remove that material.

These and other objects are accomplished by the present automatic part balancing system that measures part imbalance and removes the necessary part material to render the part rotationally balanced. The system is particularly suitable for balancing parts that have been produced by numerical methods on a numerically controlled cutting machine whereby critical portions of the parts can easily be defined by a part cutting program. The purpose of the system is to modify appropriate portions of a part cutting program so that the part can be cut again and balanced with a modified version of the cutting program.

This balancing system is initiated by spinning the part on an imbalance measuring machine and producing electrical signals proportional to the part's dynamic imbalance. These electric imbalance signals are measured and recorded in both an X and Y plane. Corresponding X and Y imbalance signals are converted into digital format which can more easily be used by a computer. This cutting program is stored in the computer and the digital imbalance signals are used to calculate an amount and location of material that must be removed to balance the part. The calculated removal is defined as a location of a start angle of a cut, a depth of cut and a number of degrees of sweep movement of a cutting tool, that when accomplished will remove the necessary material. This information is incorporated into appropriate portions of the part cutting program. After this information is incorporated, a modified part cutting program is communicated to a numerical controller that, after the part is loaded onto the cutting machine, commands the cutting machine to perform the cutting operation on the part.

DESCRIPTION OF THE DRAWINGS

The invention may be better understood from a reading of the following description in conjunction with the drawings in which:

FIG. 1 is an elevation view of certain basic components that can be used to accomplish the steps of the balancing in one method of the present invention;

FIG. 2 is a block diagram representation of the components shown in FIG. 1;

FIG. 3 is a cutaway perspective view of a typical rotating part that is balanced by a method of the present invention.

DESCRIPTION OF THE PREFERRED EMBODIMENTS

Figure 4A:
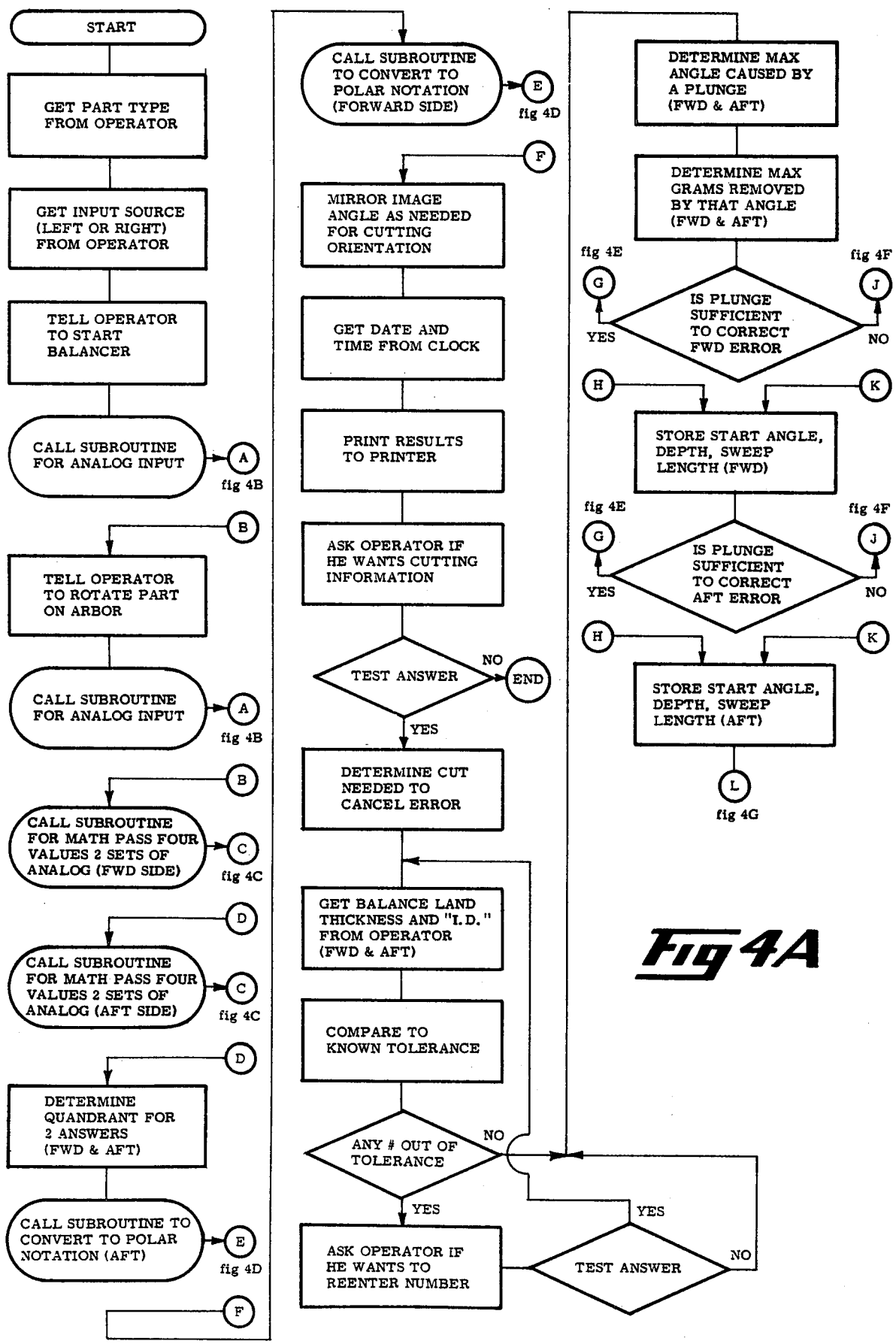
FIGS. 4A, B, C, D, E, F, G and H is a continuous block diagram representation of a computational portion of a method of the present invention.

Referring now to FIG. 1, certain basic components that can be used to accomplish the balancing method of the present invention are shown as they might be placed on an actual manufacturing plant floor. These components include a spin balancer 10, a computer 12, a numerical machine controller 14 (hereinafter referred to as an NC Controller), and a numerically controlled milling machine 16 (hereinafter referred to as an NC machine). These four components of the balancing system are shown in a position that displays component controls that must be easily accessible to an operator. The components should also be located within close proximity to each other to allow direct electrical communication between the components during balancing operations. The placement shown is also advantageous because the operation of the balancing system generally flows sequentially among the components in the order depicted.

Briefly, the operational order begins with initial measuring of part 18 imbalance by the spin balancer 10. Second, the computer 12 calculates in digital form the amount of material to be removed to balance the part 18 and transfers that information to the NC controller 14. Third, the NC controller 14 directs the NC milling machine 16 to actually remove the calculated material, and fourth, the NC machine 16 accomplishes the cutting task. This very brief summary of operations will be described in greater detail later in this description.

The electric spin balancer 10 accomplishes the initial balancing by actually spinning the part 18 on a balancing table 20 in order to electrically measure the part's dynamic imbalance during spinning with the use of typical transducers. The balancer 10 that is shown is a Schenck model M480-2/M450 made by Schenck Trebel Corporation of Deer Park, N.Y. 11729. Other spin balancers made by different companies should be equally suitable. In one method of the measuring process, the part 18 sits on rollers 22 and is spun at approximately 1500 revolutions per minute±3%. While the part is spinning, transducers mounted on the rollers are actually caused to move physically because of part movement induced by its own imbalance. Movement of the transducers produces a corresponding electrical signal with a range on the Schenck machine of plus or minus 10 volts.

The particular balancer 10 shown is capable of measuring in two planes. This permits balancing of the part in two planes. The output is four channel analog corresponding to X and Y coordinates in both planes. A readout 23 of the imbalance signal is selectible in scale on a front panel 24 of the balancer 10 and may be varied by a selector dial 26 from 0.5 grams per division to 0.01 grams per division in discrete steps. The setting of the selector 26 is controlled by the operator and directly affects input to the computer 12.

As noted, imbalance can be measured and corrected in two planes on the part 18, which will hereinafter be generally described as a left and right plane corresponding to an arbitrarily determined left and right balance plane of the part. The balancer 10 has a sealing factor that an be set twice during one run; once for each plane. This improves measurement accuracy by allowing both sets of X and Y readings to be taken on the most appropriate scale as determined by the selector 26. Notably, it has been found through experimental development that the setup of the balance machine 10 and the dimensional aspects of the part setup can be critical to obtaining accurate imbalance readings.

The output from the balancer 10 is produced in the form of electrical voltages varying from −10 volts to +10 volts (on the Schenck machine), depending on the imbalance being detected in a particular plane and axis. As noted earlier, this voltage is scaled. For example, on the 0.5 gram scale, 10 volts equals 5 grams, while on the 0.01 gram scale, 10 volts equals 0.1 grams. Therefore, the input to the computer 12 must be mulitplied by a scaling factor.

Referring briefly to FIG. 3, in addition to FIG. 1, a typical part 18 that might be balanced by a method of this invention is shown. The configuration of this part 18 has incorporated a right and left balance land, designated 28 and 30 respectively. The imbalance outputs on the 4 channel balancer 10 will correspond to X and Y planes on the right and left sides of part 18. For purposes of clarifying later discussion, these outputs will hereinafter be designated X axis Left, Y axis Left, X axis Right, and Y axis Right ($X_l$, $Y_l$, $X_r$, $Y_r$,). Again, each output varies from −10 volts to +10 volts with zero volts indicating no imbalance. Because imbalance is measured along both right and left planes material is removed from both the right and left balance lands 28 and 30 of part 18. The balance lands are located such that partial removal of part material will not affect the basic dynamics (other than balance) of the part or its operational strength.

Referring to FIGS. 1 and 2, imbalance outputs from the balancer 10 are converted into digital format with a standard eight channel analog/digital converter 32 under software control by means of a Fortran subroutine call. Procedures and equipment for accomplishing this function are known to those skilled in the art. In a method of the present invention, each channel is read 100 times over a two-second period, then averaged. Averaging is done to remove error caused by cyclic oscillation in imbalance indiction voltage. The resulting digital output ($X_r$, $Y_r$, $X_l$, $Y_l$) is supplied directly to a computational section of the computer 12.

Figures 4B, 4C, 4D, 4E, 4F:
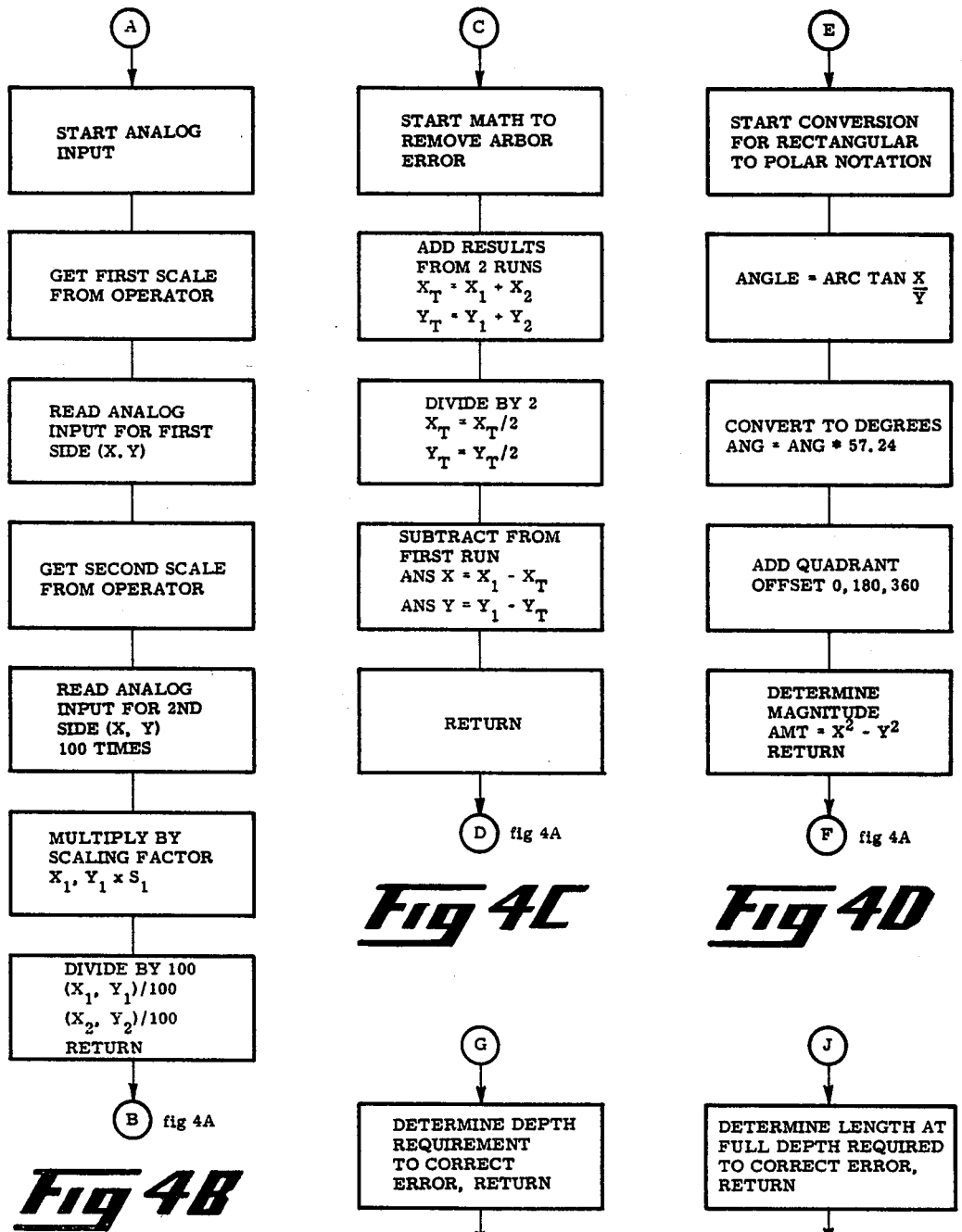

In one method of accomplishing the present invention, all software was written in Fortran IV computer language. The approximate size of the task file is 36K (16 bit). For simplicity, the program is loaded in two parts under a Command Substitution System (CSS) control. This allowed a 36K program to fit in a 32K partition. Parameters are passed between the sections via an intermediate storage file 34. Basic systems flow charts have been included with this description and are shown in FIGS. 4A, 4B and 4C. These charts are intended to serve as a guide to understanding the individual steps and the computational methods as employed in the present invention.

Referring to FIGS. 1, 2 and 3, part programs 36 (not shown) for each balance land to be cut are stored on a magnetic disc in the computer 12. The programs are based on original numerical control programs used to machine the part 18 and its balance lands 28 and 30 when the part 18 was originally machined by a numerically controlled milling machine. In order to personalize each program to recut the balance lands of the part 18, certain variables must be inserted into the part program. If the part is remachined with the right variables inserted into the part program 36, the balance lands of the part 18 will then be altered to render the part itself dynamically balanced.

These variables have been conceptualized in terms of three separate variable parameters. The first variable is a Start Angle (SA) that is defined as a number of degrees from a home reference that a machine rotary table must be turned before starting a cut. The second variable is Depth of Cut (DC) defined as a depth into the balance land that a cutter 38 is to move. The Depth of Cut (DC) is set at a maximum allowable depth (as dictated by part dimensions) when proper balancing necessitates a balancing cut that requires a sweep of the cutting tool 38. A third variable is Sweep Length (SL) defined as the number of degrees that the part is rotated during a sweep type of cut. This is set to zero if no sweep is required.

The part programs 36 are stored in Electronic Industries Association (EIA) format and the location for the variable insertion is marked by an EIA "Q" (hexidecimal 58), and would read as follows:

N1111 B - Q F 5.0
N2222 X - Q F 99.999
N3333 B - Q F 5.0

As each "Q" is located by the program, a proper modifying number is put in its place to produce a modified (personalized) part program. A typical example of such modifying is as follows:

N1111 B - 87.300 F 5.0 (start angle)
N2222 X - 0.1000 F 99.999 (depth of cut)
N3333 B - 7.3 F 5.0 (sweep length)

After the part program has been modified with the above information, it is communicated to the NC controller 14 using a digital Input/Output (I/O) board (not shown but generally known to those skilled in the art). This communication uses handshaking signals (also known to those skilled in the art) to control the flow of information. The handshaking signal from the NC controller is tapped from a tape input controller board and is meant to control tape movement within the NC controller 14.

It is important to note that a file for the modified part program is now longer than an original file for the original part program 36. Some records of the original file have not been modified and some have; based on locating a "Q" in a record. This problem is overcome by setting record length of an output file large enough to handle the addition of all three modifying numbers. A count of the number of characters added to the record is maintained. When an input record is complete, the number of fill characters needed is determined by subtracting the number of characters added to the input record from whatever number of spaces was allotted. To fill the record, hexidecimal 7F's are used (EIA deletes) since these will be ignored by the NC controller 14.

After the part program 36 has been fully modified as described above, the modified program is ready for transmission to the NC controller 14 (see FIGS. 1 and 2). The operator of the system then removes the part 18 from the spin balancer 10 and places the part on a working area of the NC cutting machine 16. A command is made to the computer 12 to transmit the modified program to the NC controller 14 which, in turn, commands the NC machine 16 to remove the necessary material to balance the part 18.

METHOD OF DETERMINING MATERIAL REMOVAL

The conceived procedures carried out within the computer 12 for determining the necessary material removal will now be described. A flow chart of these procedures is shown in FIGS. 4A, B, C, D, E, F, G and H. These figures should be referred to in conjunction with the following method description.

Referrring again briefly to FIG. 1, in conjunction with FIGS. 4A through H, many of the parts 18 that might be balanced may not have shafts and will have to be balanced with the use of an arbor 40. This arbor 40 will have an imbalance error of its own and the effect must be considered in determining the imbalance of the part.

ARBOR IMBALANCE

Referring now to FIG. 4C, in order to calculate the arbor imbalance error, the part is spun twice in the spin balancer 10; once with the part at zero degrees on the arbor 40, and once with the part at 180 degrees on the arbor. In other words, the part is rotated 180 degrees on its axis. The calculations made are as follows:

Data Used $X_1, X_2, Y_1, Y_2$ where these values are the imbalance signals in the $X$ and $Y$ planes.

$$\text{Arbor Imbalance } X = \frac{X_1 + X_2}{2}$$

$$\text{Arbor Imbalance } Y = \frac{Y_1 + Y_2}{2}$$

PART IMBALANCE

Now that the arbor imbalance has been determined, the part imbalance can be determined as follows:

Part Imbalance $X = X_1 -$ Arbor Imbalance $X$
Part Imbalance $Y = Y_1 -$ Arbor Imbalance $Y$ These values of calculated part imbalance ($X$ and $Y$) are used in further imbalance determinations.

RECTANGULAR TO POLAR CONVERSION

Referring now to FIG. 4D, it is necessary to show the part imbalance in polar format for the operator's use and the NC controller's use, rather than X and Y coordinates. To accomplish this conversion, the following process is used:

Data Used $= X, Y$

Angles (in radians) $=$ Arc Tangent $\frac{X}{Y}$

Gram Weight $=$ the square root of $(X^2 + Y^2)$

Angle (in degrees) $=$ Angle (in radians) $\times$ 57.295

Again, further imbalance determinations utilize these calculated gram weight and angle values.

DETERMINATION OF CUT SIZE

Referring now to FIGS. 4A through F, the size of the required cut to balance the part must be based on several factors including density of material, balance land thickness, balance land inside diameter, balance land outside diameter, cutter size and gram weight to be removed. Some of these factors can be based on either the dimensions programmed into the computer or they can be measured on the actual part being balanced if that is necessary to provide sufficient accuracy. In further descriptions, the following symbols will be used:

Ri = inside diameter to balance land
Ro = outside diameter to balance land
H = (Ro − Ri) = balance land height  Rmil = radius of cutter  Dens = density of part material  T = thickness of balance land The steps as outlined below are one method of the invention that can be used to determine the necessary material removal.

1. Find a maximum angle that will be produced by a full cutter plunge, a full cutter plunge means that the cutter passes to the full depth of the part balance land. This determination is a reiterative process. In the calculating procedure, the maximum angle value (Max Angle) is varied from zero on up until the depth of cut produced equals H.

$$H = R\text{mil} \left[ 1 - \cos \frac{(Ri \times \text{Max Angle})}{R\text{mil} \times 2} \right] -$$

-continued $$Ri\left[1 - \cos\frac{(\text{Max Angle})}{2}\right]$$

When the answer of the above calculation equals H, then the maximum angle equals the maximum angle produced by a full plunge of the machine cutter.

2. Find what gram weight is removed by a cut having an angle equal to the maximum angle.

If: $K = \frac{Ri}{Rmil}$

Then: Grams removed (by the cutter) = Dens $\times$ $T$ $\times$ $R\text{mil}^2$ $\times$ $$\frac{\cos(\text{Max Angle})}{2} \times [K \times \text{Max Angle} -$$

$$\sin(K \times \text{Max Angle})] - K^2[\text{Max Angle} - \sin(\text{Max Angle})].$$

3. Test to determine if the plunge will correct the part imbalance error. If the part imbalance is less than the result of step two above (the maximum grams removed by a full plunge), then the part can be balanced by using a cutter movement that is equal to or less than a full plunge. If the part imbalance is greater than the results of step two above, then the method requires the use of a sweep (meaning the machine cutter sweeps through an angle removing the entire balance land throughout that sweep angle).

4. Determine plunge corrections for less than a full plunge if required by step three above.

a. This procedure, again, is a reiterative step. The angle of the cut is varied from zero on up until the gram weight removed equals the previously determined gram weight imbalance of the part.

If: $K = \frac{Ri}{Rmil}$

Then: Varying $I$:

Ang = $I/57.295$ ($I$ = 0, 1, 2, 3, etc. . . . )

Correction = $\frac{\text{Dens} \times T \times R\text{mil}^2}{2} \times \cos\frac{\text{Ang}}{6} \times$ $[K \times \text{Ang} - \sin(K \times \text{Ang})] - K^2 \times [\text{Ang} - \sin(\text{Ang})].$ If the Correction is equal to or greater than the part imbalance gram error, then proceed; in not, increment I and repeat.

b. When the correction is equal to the part imbalance, then proceed as follows using the final value of Ang from Step 4:

$$\text{Depth of cut} = R\text{mil} \times \left[1 - \cos\frac{(Ri \times \text{Ang})}{R\text{mil}^2}\right] -$$

$$Ri \times \left[1 - \cos\frac{(\text{Ang})}{2}\right]$$

5. Determination of sweep correction. This is accomplished if a sweep of the cutter is required by step 3 above because a full plunge would not remove enough material.

a. Again, this step is reiterative. The purpose of this step is to vary the angle produced by a sweep of the machine tool 38 until the gram weight removed from the balance land equals the part imbalance.

$$Rm = \frac{(Ri + Ro)}{2}$$

$$Rc = Ri + Ri \times \left[1 - \cos\frac{(\text{Max Ang})}{2}\right] + \frac{(Ro - Ri)}{3}$$

$$A = 2(\text{Dens} \times Rm \times H \times T)$$

$$C = \frac{(\text{Dens} \times T \times R\text{mil}^2)}{2}$$

$$K = Ri/Rmil$$

Varying $I$:

Sweep = $\frac{I}{57.295}$ ($I$ = 0, 1, 2, 3, etc. . . . )

Gram error = $A \times \sin\frac{(\text{Sweep})}{2} + (C \times [(K \times \text{Max Ang}) -$ $\sin(K \times \text{Max Ang})] - K^2 \times [\text{Max Ang} - \sin(\text{Max Ang})]) \times$ $$\left(\cos\left[\frac{(\text{Sweep})}{2} + \frac{(\text{Max Ang})}{6}\right]\right)$$

When the result of the Gram Error calculated above equals the part imbalance then the sweep of the cutter would remove enough material and provide the necessary machine tool rotation to balance the part 18.

The data produced by the calculations are: one, determination of a sweep or plunge cut; two, depth of plunge or length of sweep cut needed.

SUMMARY OF COMPLETE PROCESS

In FIGS. A through H, the procedural flow chart summarizes the sequence of operations occurring in the computer as just described. The operations performed by the computer (as shown in FIGS. 4A through H) fit into the overall balancing system procedures in the manner depicted in FIG. 2.

Referring specifically to all FIGS. 4A through 4H, the steps in the flow chart form an outline of the full sequence of one method of balancing operations. These operations start with the operator specifying the part type, feeding the part type information to the system, and then initiating spin balancing. At various stages as designated in the flow chart, the operator performs certain tasks, which could be eliminated as the system becomes increasingly automated. The sequence depicted in the flow chart terminates with a full determination of the amount and location of material to be removed from the balance lands. At this stage, the operator's function is to place the part in the NC machine 16 as shown in FIG. 1 and simply command the NC controller 14 to commence machining operations. When the machining operations are completed, the final result is a dynamically balanced part.

The steps outlined in FIGS. 4A through H are intended to form a guide. Significant changes could be made while still carrying out the method of the invention. In regard to the entire description, it will be apparent to those skilled in the art that various modifications and alterations may be made to the steps and to the overall invention as disclosed. For example, certainly different machine components could be substituted for those components described and illustrated. As another example, the steps could be expanded, contracted or modified to provide varying degrees of system automation. Numerous other changes could be made without departing from the scope of the claims hereinafter set forth.

We claim:

1. A method of dynamically balancing a part of known dimensions and density, by removing material, said method comprising the steps of:

(a) providing a balance land on the part, the balance land being in the form of a circular projection which is centered around a central axis about which the part is intended to rotate;

(b) defining and storing in a computer, part dimensions and density;

(c) defining and storing in a computer a part cutting program;

(d) defining and storing said balance land inner diameter, outer diameter and thickness in said computer;

(e) measuring dynamic imbalance of the part and producing electrical error signals having a voltage proportional to the measured imbalance;

(f) converting said error signals from analog to digital format and recording the digital error signals in said computer;

(g) based on said digital error signals and said part dimensions and density, determining an amount and location of material that must be removed from the balance land of the part to render the part dynamically balanced, the determination including determining a start angle for said cut, a depth of cut and a sweep length of said cut, the start angle being determined by a procedure including the following steps (i) measuring imbalance on X and Y coordinates in both planes of measurement to produce X and Y analog imbalance signals;

(ii) converting analog X and Y imbalance signals to digital format;

(iii) determining a mid-angle as a midpoint of the cut based on said mid-angle being equal to an arc having a tangent (X/Y) with a necessary quandrant correction; and (iv) determining a start angle such that the mid-angle is at a midpoint of said sweep of said cutter;

(h) inserting the determined start angle, depth of cut and sweep length into an appropriate portion of said part cutting program, and (i) executing the modified part cutting program with said controller on a controlled cutting machine to cut the part and render the part dynamically balanced.

* * * * *